Figure 1:
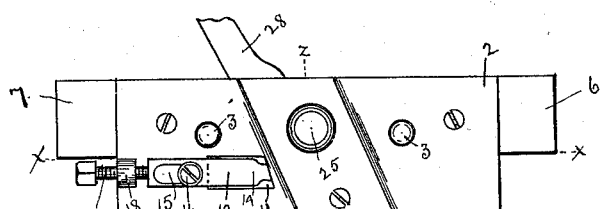

No. 613,118. Patented Oct. 25, 1898.
A. CARRIER.
MACHINE FOR COMPRESSING SIDES OF SWAGED SAW TEETH.
(Application filed Jan. 12, 1898.)
(No Model.)

Attest:
Jas. E. Thomas
Jos. J. Forcier

Inventor:
Arthur Carrier
By Leo P. Thomas
His Atty.

UNITED STATES PATENT OFFICE.

ARTHUR CARRIER, OF BAY CITY, MICHIGAN.

MACHINE FOR COMPRESSING SIDES OF SWAGED SAW-TEETH.

SPECIFICATION forming part of Letters Patent No. 613,118, dated October 25, 1898.

Application filed January 12, 1898. Serial No. 666,380. (No model.)

*To all whom it may concern:*

Be it known that I, ARTHUR CARRIER, a citizen of Canada, residing at Bay City, in the county of Bay and State of Michigan, have invented certain new and useful Improvements in Machines for Compressing the Swaged Ends of Saw-Teeth, of which the following is a specification, reference being had to the accompanying drawings, and to the reference characters marked thereon, which form a part thereof.

This invention relates to improvements in machines of the class which are used for compressing the extended side edges of the swaged ends of saw-teeth for reducing the cutting edges of the teeth to a uniform lateral dimension; and the invention consists chiefly in the combination and arrangement of the several parts and in the construction and operation of the same, as I will hereinafter describe in detail, and which will also be specifically pointed out in the claims of this specification.

The object of the invention is to provide a means for making the swaged points of a series of teeth in a saw of the same transverse dimension without cutting or grinding away the material from the lateral sides of the swaged points, whereby a saving of material is effected and the efficiency of the saw is increased.

Another object of the invention is to provide a device for compressing the swaged ends of saw-teeth laterally in an easy and effectual manner, so as to bring the points of the teeth to a uniform width without reducing the material of the teeth and at the same time form a stronger and more reliable cutting-point on the tooth.

Another object of the invention is to provide a machine for compressing the lateral portions of the swaged ends of saw-teeth which can be smoothly and rapidly moved from one tooth to another of the saw and which can also be quickly and accurately adjusted for reducing the extended width thereof more or less, as desired.

I attain these objects by means of the devices illustrated in the accompanying drawings, in which—

Figure 2:
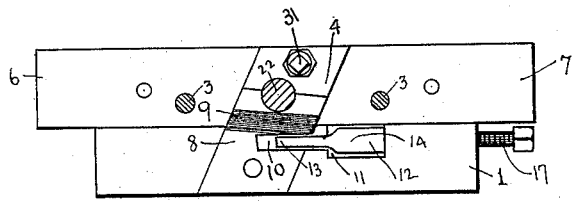
Figure 3:
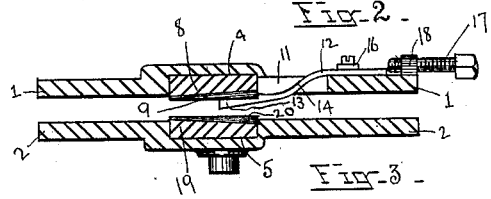
Figure 6:
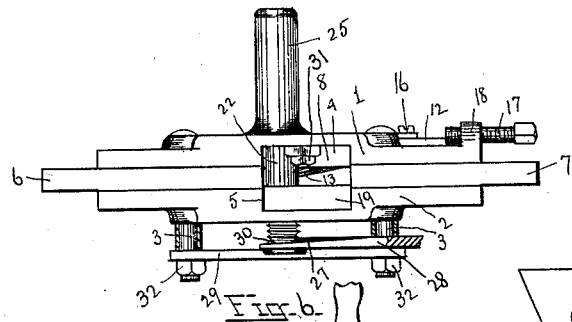
Figure 5:
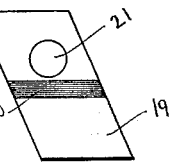
Figure 4:
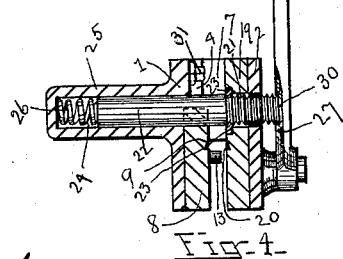

Figure 1 is a side view in elevation of my improved machine. Fig. 2 is a vertical central longitudinal section of the same. Fig. 3 is a horizontal section of the same, taken at $x x$ in Fig. 1. Fig. 4 is a vertical transverse section of Fig. 1 taken at $z z$. Fig. 5 is a face view of the movable compressing-die detached. Fig. 6 is a top or plan view of Fig. 1.

The same reference characters are used throughout the several views to designate the same parts.

1 is the stationary or main section of the body portion of the machine, and 2 is a removable section, the two sections being held firmly in position in relation to each other by the transverse bolts 3.

The under side of section 1 is provided on its middle portion, between the bolts, with a transverse recess 4, arranged at a slight incline, while the section 2 is provided with a recess 5 at a point opposite and having the same inclination as the recess 4, and between the end portions of the body-sections, on each side of the recesses, are the steel front support 6 and rear support 7, which are clamped by the bolts 3 tightly between the end portions of the body-sections, the inner ends of the pieces 6 and 7 being arranged with an angle which corresponds to the angle of the edges of the recess.

Within the recess 4 is placed a stationary compressing-die 8, having the point coincident with the lower edges of the pieces 6 and 7, and is provided with a die-face 9, which is arranged with an upward and outward inclination toward the front edge of the die adjacent to the front support 6.

On the front edge of the die and directly below the die-face 9 is provided a recess 10, and the body-section 1 is provided with an opening 11, located directly in front of the recess 10, and through this opening and extending into the recess 10 is placed a gage-piece 12, which is provided, on the inner surface of its inner end, with an inclined surface 13, with a thin middle portion 14, that forms a spring and is bent slightly to pass through the opening, while its outer end extends along the side of the body-section and is provided with a slot 15, through which is passed a bolt 16, which is also tapped into the body-section for retaining the gage-piece in position and for allowing an adjustment of the same endwise, and 17 is a screw tapped through a boss 18 and is arranged with its inner end bearing against the forward end of the gage-piece for making a fine adjustment of the same when required.

Loosely fitted within the recess 5 is placed a movable die 19, provided on the front edge of its inner side with a die-face 20, which has a form the same as the die-face 9 for opposing the same, and this die is provided with a transverse opening 21, preferably threaded, through which is passed the threaded outer end of a pin 22, which is rigidly secured in position by a jam-nut 23, passed over its outer threaded end, while the inner end of the pin extends over the die 8 and into a chamber 24, formed in a laterally-extended portion 25 of the body-section 1 for forming a guide and support for the pin to allow a longitudinal movement of the same to carry the movable die toward and away from the stationary die, and within the inner end of the chamber is placed a coiled spring 26, which actuates the pin outwardly and moves the die 19 away from the stationary die, while the outer end of the pin is provided with an inclined outer surface 30, which is acted upon for moving the die 19 inwardly for impinging upon the saw-tooth by a cam-face 27 on the inner side of a lever 8, that has its lower end pivoted to the outer side of the body-section 2 and is provided on its upper end with a handle for oscillating the lever on its pivot, while on the outer side of the lever, opposite the cam-face, is arranged a supporting-bar 29, which is secured by openings on its ends being passed over the outer ends of the bolts 3, where they are secured by the nuts 32.

31 is a stop-bolt tapped into the body-section 1 in the upper portion of the recess 4 and above the die and the head of the stop projects inwardly and is adjusted to stop the inward movement of the die 19 at the time the inner side of the lower face of the die is impressed upon the side of the saw-plate.

The machine is placed upon the saw with the teeth between the body-sections and with the lower edges of the supporting-pieces 6 and 7 resting upon the points of the saw-teeth which have been recently swaged and with the rear inner end of the gage-piece 12 resting against the front edge of the tooth to be operated upon, which is then located so that its swaged point rests between the die-faces 9 and 20 in the proper position to allow the required width of tooth, and the machine then being firmly held in this position by the left hand the lever is oscillated toward the rear by the right hand, and the cam-face 27 then acts upon the inclined surface 30 and actuates the pin 22 and the die 19 inwardly until the plain inner surfaces of the dies rest against the lateral sides of the saw-plate, and the recessed die-faces then have compressed the extended lateral edges of the swaged ends of the tooth to form the desired width of cutting-point, and the lever is then oscillated forwardly and the spring 26 actuates the pin and die outwardly, and the machine is then pushed forwardly to bring the inclined portion 13 of the gage in contact with the rear edge of the next tooth, and this edge in sliding over the tooth causes the spring-gage to recede into the recess 10 and pass the tooth, after which it at once extends in front of the tooth, and then on moving the machine slightly to the rear the gage is brought in contact with the front edge of the tooth, as before, and the operation is repeated.

It will be seen that the construction and operation of my improved machine are extremely simple and easy and also that the peculiar form of the die-faces provides a contour for the lateral edges of the saw-teeth that, while the cutting edges of the teeth are "backed up" and fully supported by the material compressed by the dies, the teeth at the same time have a free and easy action through the timber, that is retained until the cutting edges of the teeth are worn to need regrinding, and by compressing the material into the tooth the period of time for the use of the saw is prolonged and great expense saved.

Having described the construction and operation of my improvement, what I claim as new, and desire to secure by Letters Patent, is—

1. In a side-compressing machine for saw-teeth, the combination of the body-sections having on the middle portions of their adjacent faces the inclined transverse recesses for the dies, and with the supporting-pieces between their end portions, a stationary die secured in one of said recesses and a movable die in the opposite recess, said dies being provided with opposing die-faces having an outward inclination toward their front edges, and means for actuating said movable die toward said stationary die, with a spring gage-piece having its outer end secured to the body-section and having its inner end extending into the space between the dies for contact with the front edge of the saw-tooth, and having an inclined surface on the side of its inner end for moving the end sidewise by contact with the next tooth as the machine is moved forwardly, and means for adjusting said gage-piece endwise, substantially as set forth.

2. In a side-compressing machine for saw-teeth, the combination of the body-sections having on the middle portion of their adjacent faces the inclined transverse recesses for the dies, and with the supporting-pieces between their end portions, a stationary die secured in one of said recesses and a movable die in the opposite recess said dies provided with opposing die-faces having an outward inclination toward their front edges and means for actuating said movable die toward said stationary die, with a spring gage-piece having its outer end secured to the body-section and having its inner end extending into the space between the dies for contact with the front edge of the saw-tooth and having an inclined surface on the side of its inner end for moving the end sidewise by contact with the next tooth as the machine is moved forwardly, and means for adjusting said gage-piece endwise, substantially as set forth.

In witness whereof I hereunto affix my signature, this 6th day of August, 1897, at Bay City, Michigan.

ARTHUR CARRIER.

Witnesses:
 WARD W. HODGKINS,
 GEO. P. THOMAS.